United States Patent Office.

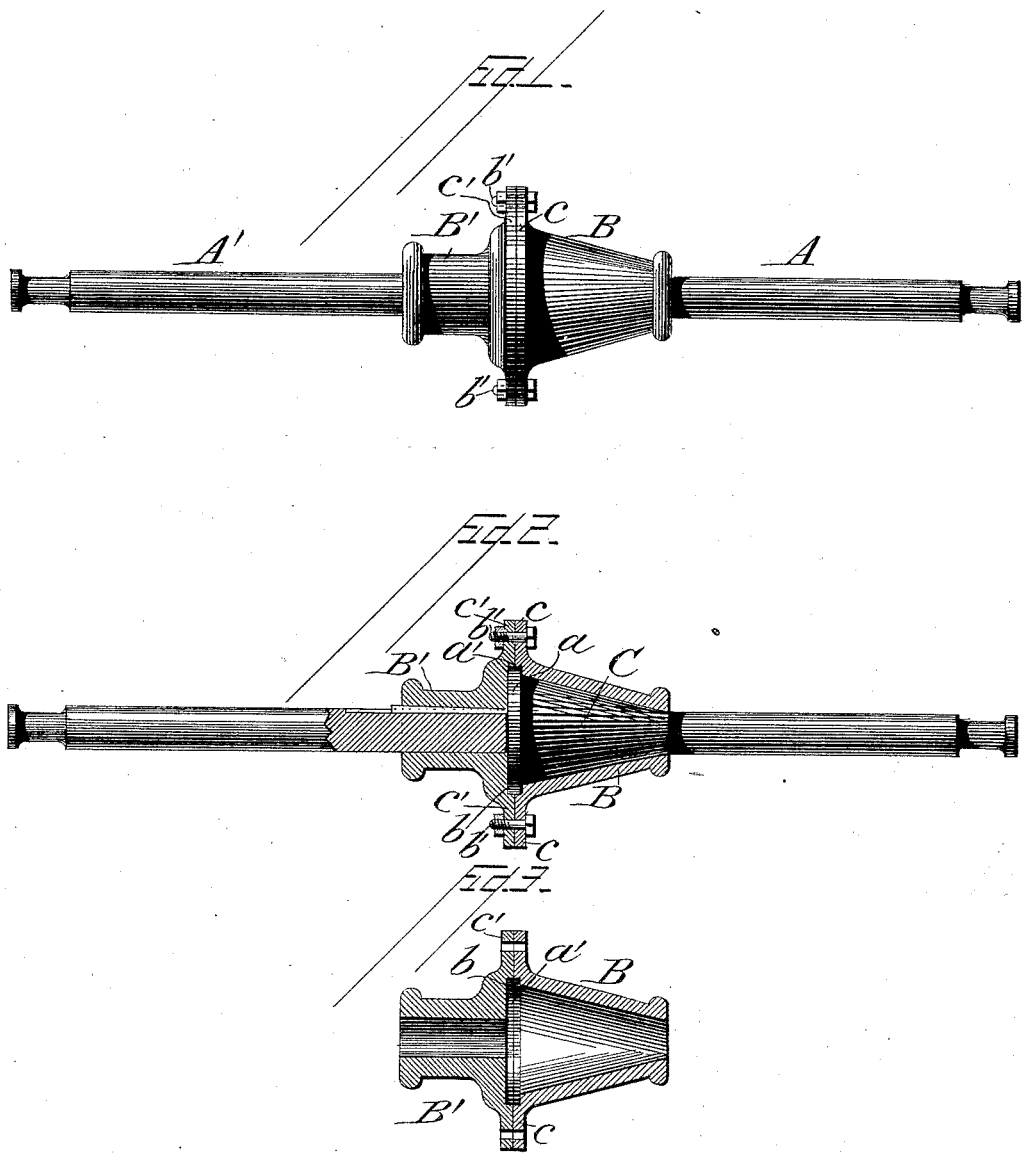

SAMUEL L. DENNEY, OF CHICAGO, ILLINOIS, ASSIGNOR OF ONE-HALF TO HUGH KIRKWOOD, OF MINNEAPOLIS, MINNESOTA.

CAR-AXLE.

SPECIFICATION forming part of Letters Patent No. 448,639, dated March 24, 1891.

Application filed June 23, 1888. Renewed August 7, 1890. Serial No. 361,389. (No model.)

*To all whom it may concern:*

Be it known that I, SAMUEL L. DENNEY, a citizen of the United States, residing at Chicago, in the county of Cook and State of Illinois, have invented certain new and useful Improvements in Car-Axles; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to an improvement in that class of car-axles known as "divided axles," the object being to improve upon the axle shown in United States Patent No. 366,307, granted to me on the 12th day of July, 1887, by lessening the cost of construction, while retaining all the durability and efficiency of that axle. To accomplish this object I form the inner end of one part of the axle as a conical frustum and provide a sleeve having the same form internally, which slips upon the smaller end of the axle and receives its coned part. The other part of the axle is provided on its inner end with a plain cylindrical sleeve firmly secured thereto, both sleeves being provided with radial flanges that are securely bolted together, thus forming a coupling which connects the two parts of the axle firmly, but allows the wheels upon the opposite ends to revolve independently, so that in passing a curve each wheel travels upon its rail without slip or tendency to derailment.

In the drawings, Figure 1 is a side elevation of the axle complete. Fig. 2 is a longitudinal section through the coupling and that portion of the axle connected therewith. Fig. 3 is a longitudinal section through both parts of the coupling-sleeve, the axle being left out.

In the figures, A represents that part of the axle provided with a conical inner end, and A' the cylindrical part. The part A has at the base of the cone C a radial extension or flange $a$, which enters a recess $a'$, formed in the larger end or flange $c$ of the conical sleeve B. This recess is not of sufficient depth to contain the whole of the flange $a$, but allows a portion of it to project, which projecting portion enters the recess $b$ in the flange $c'$ of the sleeve B', forming that part of the coupling secured to the portion A' of the axle. By this means both parts of the axle are retained in alignment when the flanges upon the two parts of the coupling are brought together. The sleeve B' has a cylindrical opening through it of the same diameter as the inner end of the part A' of the axle, and is secured thereto by a key or such other means as will cause them to be firmly united, so that the flange $c'$ shall always retain its face at right angles to the axial line of said axle, thus insuring by its connection with the flange $a$ upon the base of the cone C the perfect alignment of the whole axle. Holes registering with each other are bored through the flanges $c$ and $c'$, through which pass the bolts $b\ b$, by which the two parts of the sleeve are firmly united. In case of wear between the conical ends of the part A' of the axle and its inclosing sleeve such wear may be taken up by inserting between the end of said axle and the flange $c'$ washers of suitable thickness; but as the movement of the parts upon each other is comparatively slight the axle will be in use a long time before such adjustment will become necessary.

It will be observed that by constructing the axle as herein described it becomes necessary to bore out and fit but one conical sleeve to the axle instead of two, as in my patent hereinbefore referred to, while all the advantages of a firm and solid connection of the two parts of the axle, as well as facilities for adjustment, are retained at less cost.

Having thus described my invention, I claim as new, and desire to secure by Letters Patent, the following:

1. As an improvement in divided car-axles, the combination of the conical-ended part of the axle and its loose coned sleeve with the cylindrical part, its sleeve firmly secured thereon and the bolts uniting such sleeves to form a coupling for the two parts of the axle, as set forth.

2. As an improvement in divided car-axles, the part A, having a conical enlargement and radial flange $a$ at its inner end, in combination with the sleeve B, inclosing said conical enlargement and having a recess $a'$ to receive the radial flange $a$ of the axle, substantially as specified.

3. As an improvement in divided car-axles, the part A, having a conical enlargement, and the sleeve B, inclosing said enlargement, in combination with the part A' and sleeve B', provided with recessed flange $c'$ to receive the radial flange $a$ of the part A, all arranged substantially as shown and described.

In testimony whereof I affix my signature in presence of two witnesses.

SAMUEL L. DENNEY.

Witnesses:
 THOMAS D. TODD,
 FRANCIS H. NICHOLS.